United States Patent
Mukoyama et al.

(10) Patent No.: US 9,728,950 B2
(45) Date of Patent: Aug. 8, 2017

(54) CRYOGENIC CABLE TERMINATION CONNECTOR

(75) Inventors: Shinichi Mukoyama, Tokyo (JP); Tokui Yonemura, Tokyo (JP); Shuka Yonemura, legal representative, Chiba (JP); Masashi Yagi, Tokyo (JP); Tomoya Nomura, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 424 days.

(21) Appl. No.: 13/576,689

(22) PCT Filed: Jan. 31, 2011

(86) PCT No.: PCT/JP2011/051860
§ 371 (c)(1),
(2), (4) Date: Aug. 2, 2012

(87) PCT Pub. No.: WO2011/096348
PCT Pub. Date: Aug. 11, 2011

(65) Prior Publication Data
US 2013/0059463 A1    Mar. 7, 2013

(30) Foreign Application Priority Data
Feb. 4, 2010 (JP) .................. 2010-022909

(51) Int. Cl.
*H01B 17/26* (2006.01)
*H02G 15/20* (2006.01)
(Continued)

(52) U.S. Cl.
CPC .................. *H02G 15/34* (2013.01)

(58) Field of Classification Search
CPC ....................................... H02G 15/34
(Continued)

(56) References Cited

U.S. PATENT DOCUMENTS 3,728,463 A * 4/1973 Kullmann ............... H01B 12/00
                                                      174/12 R
3,764,726 A * 10/1973 Kohler ................... H01B 12/00
                                                      174/15.3
(Continued)

FOREIGN PATENT DOCUMENTS

CN    1457541    11/2003
CN    1989577    6/2007
(Continued)

OTHER PUBLICATIONS

International Search Report Issued Mar. 29, 2011 in PCT/JP11/51860 Filed Jan. 31, 2011.
(Continued)

*Primary Examiner* — Timothy Thompson
*Assistant Examiner* — Rhadames J Alonzo Miller
(74) *Attorney, Agent, or Firm* — Oblon, McClelland, Maier & Neustadt, L.L.P.

(57) ABSTRACT

A cryogenic cable termination connector having a small heat inflow from the outside and stable electrical insulation properties. The cryogenic cable termination connector includes a lead-out conductor led out from a site at a very low temperature to a site at room temperature via a liquid refrigerant layer, a refrigerant gas layer, and an oil layer. The lead-out conductor includes a capacitor-cone insulator in which plural metal foils for dividing an electric field from a high voltage level down to the ground voltage level are stacked through an insulator. Among electric field tilting portions in which voltage changes gradually from the high voltage level to the ground voltage level, an electric field tilting portion positioned at a lower part is located in the liquid refrigerant layer and an electric field tilting portion positioned at an upper part is located in the oil layer.

8 Claims, 4 Drawing Sheets

(51) Int. Cl.
*H01B 12/00* (2006.01)
*H01R 13/00* (2006.01)
*H02G 15/34* (2006.01)

(58) Field of Classification Search
USPC .......................................... 174/15.3; 439/485
See application file for complete search history.

(56) References Cited

U.S. PATENT DOCUMENTS

| | | | | | |
|---|---|---|---|---|---|
| 3,801,723 | A | * | 4/1974 | Kubo | H01B 12/00 174/15.3 |
| 6,888,060 | B2 | * | 5/2005 | Ashibe | H02G 15/34 174/15.3 |
| 7,168,744 | B2 | * | 1/2007 | Ashibe | F16B 31/04 220/560.04 |
| 7,729,731 | B2 | * | 6/2010 | Ashibe | H02G 15/34 174/15.3 |
| 2003/0154727 | A1 | * | 8/2003 | Ashibe | H02G 15/34 62/45.1 |
| 2007/0158106 | A1 | * | 7/2007 | Tilliette | H01B 17/28 174/652 |
| 2007/0191231 | A1 | * | 8/2007 | Ashibe | H02G 15/34 505/220 |
| 2008/0119362 | A1 | * | 5/2008 | Ashibe | H01R 4/68 505/211 |
| 2008/0318159 | A1 | | 12/2008 | Fujimori | |

FOREIGN PATENT DOCUMENTS

| | | | |
|---|---|---|---|
| JP | 54-8698 | | 1/1979 |
| JP | 8 196032 | | 7/1996 |
| JP | 08196032 | A * | 7/1996 |
| JP | 2001 8356 | | 1/2001 |
| JP | 2002 280628 | | 9/2002 |
| JP | 2005 33964 | | 2/2005 |
| JP | 2005 117724 | | 4/2005 |
| JP | 2005117724 | A * | 4/2005 |
| JP | 2008 507829 | | 3/2008 |
| TW | 200633336 | | 9/2006 |

OTHER PUBLICATIONS

Office Action issued Jul. 16, 2013 in Japanese Patent Application No. 2010-022909 (with English language translation).
Office Action issued on Jan. 14, 2014 in the corresponding Japanese Patent Application No. 2010-022909 (with English Translation).
International Preliminary Report on Patentability issued Sep. 18, 2012, in International application No. PCT/JP2011/051860.
International Preliminary Report on Patentability issued Aug. 7, 2012, in International application No. PCT/JP2011/051860.
Written Opinion of the International Searching Authority issued Mar. 29, 2011, in International application No. PCT/JP2011/051860 (with English translation).
Chinese Office Action issued Sep. 2, 2014, in China Patent Application No. 201180008315.5 (with English translation).
Office Action issued in Chinese Application No. 201180008315.5 on Mar. 27, 2015 with English Translation.
Office Action issued Sep. 2, 2015 in Chinese Patent Application No. 201180008315.5 (with English language translation).
Office Action issued Mar. 4, 2016 to Chinese Patent Application No. 201180008315.5, with English translation.

* cited by examiner

CRYOGENIC CABLE TERMINATION CONNECTOR

TECHNICAL FIELD

The present invention relates to a terminal structure of a cryogenic cable and a superconductive cable for transmitting electric power.

BACKGROUND ART

A superconductive cable and a cryogenic cable cooled by a cryogenic refrigerant such as liquid nitrogen are operated at −100° C. to −200° C. In order to transmit power using these cables, it is necessary to connect a room temperature equipment such as a transformer and a open/close switch which are in a room temperature part to a cable in a cryogenic environment, and a cable terminal needs a termination connector.

This termination connector has a great temperature tilt (temperature gradient) from a temperature of liquid nitrogen, which is a very low temperature, to room temperature because one end of the connector is cooled by liquid nitrogen and the like and the other end is led out into the air. A general cryogenic cable termination connector will be explained using FIG. 3.

FIG. 3 is a longitudinal sectional view showing an example of a conventional general cryogenic cable termination connector. A conductor 10 such as a cryogenic cable is connected to a lead-out conductor 3 through a connector 20 as shown in FIG. 3. The lead-out conductor 3 passes through a cryogenic section 11 consisting of a liquid refrigerant layer 5 such as liquid nitrogen, and a temperature tilting section 12 consisting of a refrigerant gas layer 4 which consists of nitrogen gas and the like connected above the liquid refrigerant layer 5. The lead-out conductor 3 passes further through a high voltage lead-out section 13 located above this temperature tilting section 12 and is led into a high voltage terminal 24 located at an air part.

The high voltage lead-out section 13 is separated from the refrigerant gas layer 4 of the temperature tilting section 12 by a flange 6, and mainly consists of an insulator 1 and an oil layer 2 such as insulating oil which is filled inside the insulator 1. A reference numeral 21 indicates an outer pressure vessel and a reference numeral 22 indicates an inner pressure vessel in FIG. 3.

Stress cones of various shapes are usually used as a coating material (FIG. 4) of the lead-out conductor 3 which is thus located in the cryogenic cable termination connector. A stress cone includes an insulating coating 3a which is provided circumferentially around the lead-out conductor 3 such as copper and covers throughout a portion positioned at an upper part of the cryogenic section 11, a portion positioned within the temperature tilting section 12 and a portion positioned at a lower part of the high voltage lead-out section 13. In addition, bell mouth structures 3g and 3g for electric field control are provided near the both ends of the insulating coating 3a, and a flange portion 3k which abuts the flange 6 is provided at the center of the insulating coating 3a. (Patent Document 1)

Furthermore, there is also an example of a lead-out conductor 3 which is provided with a capacitor cone as shown in FIG. 5. In a configuration shown in FIG. 5, a cable insulator 3h is provided around the conductor 3 and a capacitor-cone 30 consisting of a reinforcing insulator 3i and metal foils 3j embedded therein is provided around the cable insulator 3h. (Patent Document 2)

PRIOR ART DOCUMENTS

Patent Documents

Patent Document 1: Japanese Patent Application Laid Open Publication No. 2005-33964
Patent Document 2: Japanese Patent Application Laid Open Publication No. 2001-8356

DISCLOSURE OF THE INVENTION

Problems to be Solved by the Invention

However, there has been a problem that the refrigerant gas layer cannot be long in conventionally suggested configurations which include a stress cone circumferentially around a lead-out conductor. Around the stress cone, an electric field becomes smaller in almost uniform distribution from high voltage portions at both ends of the stress cone to the central flange portion 3k. The refrigerant gas layer discharges electricity or causes an insulation breakdown when exposed to high voltage because the withstand voltage characteristic is low, being about one tenth of that of the oil layer and the liquid refrigerant. Therefore, the stress cone needs to be immersed in the liquid refrigerant up to the point where the voltage becomes smaller than the withstand voltage of the refrigerant gas layer, and thus the refrigerant gas layer of the stress cone can be only about 500 mm long.

As a result, the refrigerant gas layer has a temperature gradient from a low temperature to room temperature between the refrigerant layer at a low temperature and the oil layer at room temperature. When this part is short, there is a large heat inflow through the container wall, the gas layer, the stress cone and the conductor, and it is difficult to sufficiently reduce the heat inflow from the outside. Although a capacitor cone is used in the technique described in the Patent Document 2, length of the refrigerant gas layer is not mentioned and it is speculated that the technique has the same problem as in the case of using the stress cone.

In addition, in the two conventional techniques, both the stress cone and the capacitor cone are directly applied to the conductor which conducts electricity. In a power cable, under normal operation, when a short circuit or a ground fault occurs inside the system, there is over 10 times more current flow than a normal current flow. When there is such short circuit or ground fault current flow, the conductor is heated by the current flow and the temperature rises rapidly in the termination connector wherein the insulator is directly applied to the conductor. When the temperature rises as described above, the thermal expansion or thermal shock to the surrounding stress cone or the capacitor cone may generate excess stress to the insulator, and the insulating coating may split up.

The object of the present invention is to provide a cryogenic cable termination connector having a small heat inflow from the outside and a stable electrical insulation property.

Means for Solving the Problem

In order to solve the above-mentioned problem, the present invention includes a cryogenic cable termination connector which has a lead-out conductor led out from a very low temperature site to a room temperature site via a liquid refrigerant layer, a refrigerant gas layer and an oil layer, wherein the lead-out conductor is provided with a capacity-cone insulator in which a plurality of metal foils for dividing an electric field from a high voltage level down to a ground voltage level are stacked through the insulator, and among electric field tilting portions in each of which voltage changes gradually from the high voltage level to the ground voltage level, an electric field tilting portion positioned at a lower part is located in the liquid refrigerant layer and an electric filed tilting portion positioned at an upper part is located in the oil layer.

According to the present invention, in the configuration applying a capacitor cone circumferentially around the lead-out conductor led out from a very low temperature site to a room temperature site via a liquid refrigerant layer, a refrigerant gas layer and an oil layer, the foil location in the insulator is adjusted and thereby the electric field distribution can be adjusted to a limited extent . By the electric field tilting portions in which voltage changes gradually from the high voltage level down to the ground voltage level being located in the liquid refrigerant layer and the oil layer, it is possible to ensure reliability as insulation by the end parts of the lead-out conductor with high voltage and electric field tilting portions in which voltage changes gradually from the voltage level of the end parts to the ground voltage level being located in the liquefied gas and the oil which have high withstand voltage characteristics. On the other hand, there is no concern about electric discharge and flashover because the insulator surface in the refrigerant gas layer with low withstand voltage characteristic is at the ground voltage level.

In the cryogenic cable termination connector according to the present invention, the voltage level of the surface of the capacitor-cone insulator in the refrigerant gas layer is at the ground voltage level and the capacitor-cone insulator in the refrigerant gas layer is preferably equal to or longer than 1000 mm.

In such configuration, it is possible to determine the length of the ground voltage level portion arbitrarily by adjusting the electric field distribution of the surface of the capacitor-cone insulator. Therefore, it is possible to reduce heat penetration by lengthening the insulator which is to be at the ground voltage level (preferably, 1000 mm or longer) and lengthening a room temperature portion in the refrigerant gas layer which has low thermal conductivity and liquid refrigerant layer (very low temperature). Furthermore, it is possible to reduce heat penetration from a container wall and penetration heat through a gas layer by lengthening the refrigerant gas layer. And overall it is possible to provide a termination connecting box having a small amount of heat inflow from the outside.

In the cryogenic cable termination connector according to the present invention, the capacitor-cone insulator is applied circumferentially around a hollow pipe and the lead-out conductor preferably penetrates from a room temperature portion to a cryogenic portion inside the hollow pipe. Here, it is desirable that the difference between an outer diameter of the lead-out conductor and an inner diameter of the hollow pipe be at least 10 mm.

Thus, the lead-out conductor which consists of a good conductor such as copper or aluminum carrying an electric current is housed in the hollow metal pipe which a capacitor-cone type insulator is applied circumferentially therearound, and the difference between the outside of the conductor and the inner diameter of the hollow pipe is made to be equal to or more than 10 mm, and thereby liquefied refrigerant enters between the conductor and the hollow pipe. The conductor and liquid nitrogen contact each other directly and thereby cooling efficiency is improved and the time period for initial cooling can be shortened for example.

Furthermore, when a short circuit or a ground fault occurs in the system wherein a superconductive cable or a cryogenic cable is connected or in the cable itself, a current which is 10 to 20 times greater than a normal current flows for a short time. In this case, even if the short circuit or ground fault current flows through the conductor and the conductor heats up by the Joule heat, the gas layer with bad heat conduction is located between the insulator and the conductor, and thereby the heat conduction is weakened, thermal stress such as thermal shock and thermal expansion is not applied, and the insulator can be maintained healthy.

In the present invention, the upper part of the hollow pipe desirably has a hermetic structure with the lead-out conductor. Such hermetic structure between the upper part of the hollow pipe and the lead-out conductor makes it possible to effectively use the entire length of the hollow pipe.

In addition, in the present invention, it is desirable that a flange for hermetically dividing the refrigerant gas layer and the oil layer be provided between the refrigerant gas layer and the oil layer circumferentially around the capacitor-cone insulator. Thus, the flange for hermetically dividing the refrigerant gas layer and the oil layer is provided between the refrigerant gas layer and the oil layer circumferentially around the capacitor-cone insulator, and thereby it is possible to surely divide the temperature tilting section and the high voltage lead-out section and to easily perform relative positioning and mounting of the capacitor-cone insulator by using the flange.

Effect of the Invention

According to the present invention, it is possible to obtain a cryogenic cable termination connector having a small heat inflow from the outside and a stable electrical insulation property.

BEST MODE FOR CARRING OUT THE INVENTION

Hereinbelow, an embodiment of the present invention will be explained in detail with reference to FIGS. 1 and 2.

Figure 1:
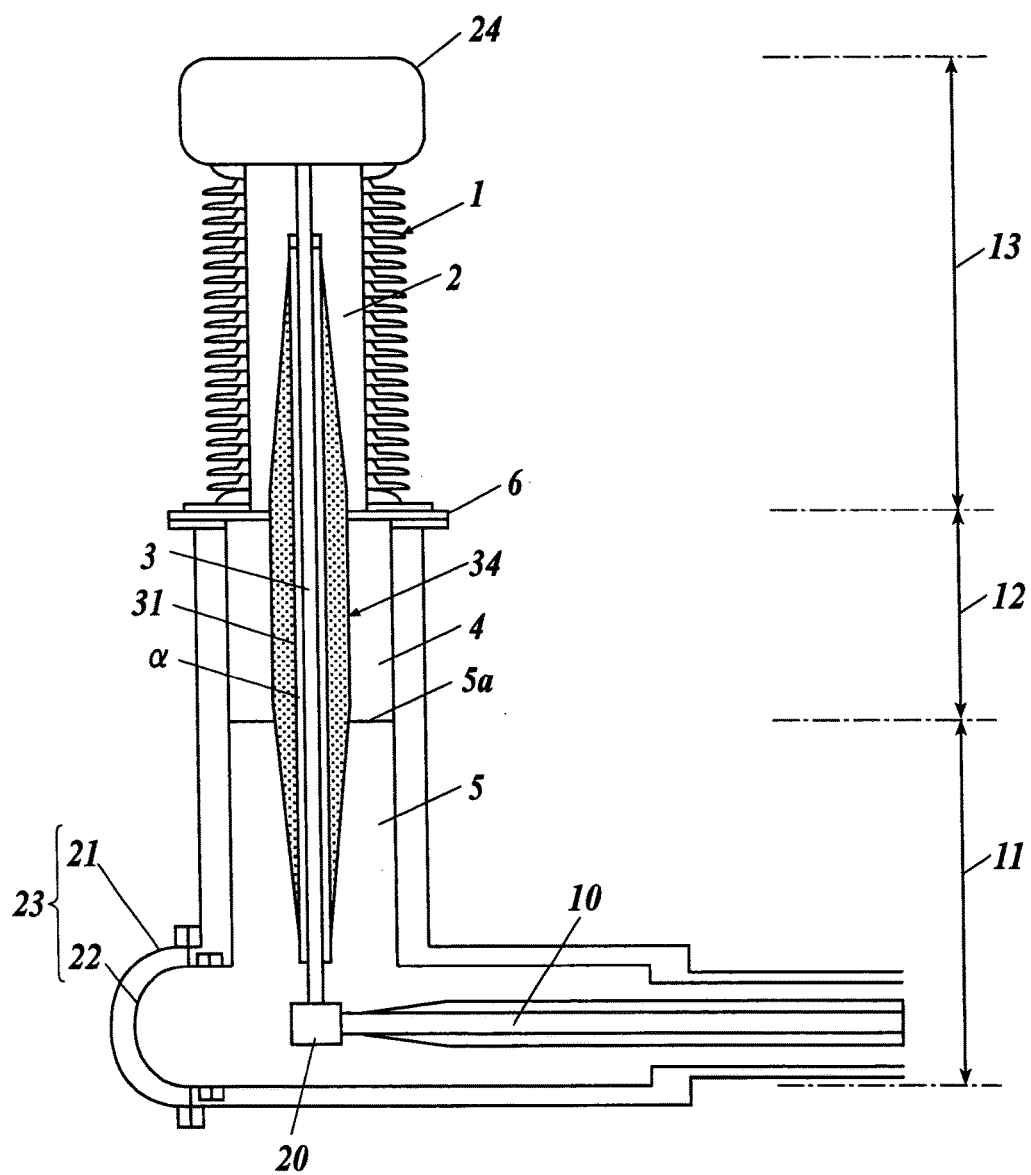
FIG. 1 This is a longitudinal sectional view showing an essential part of a cryogenic cable termination connector according to the embodiment of the present invention.
Figure 2:
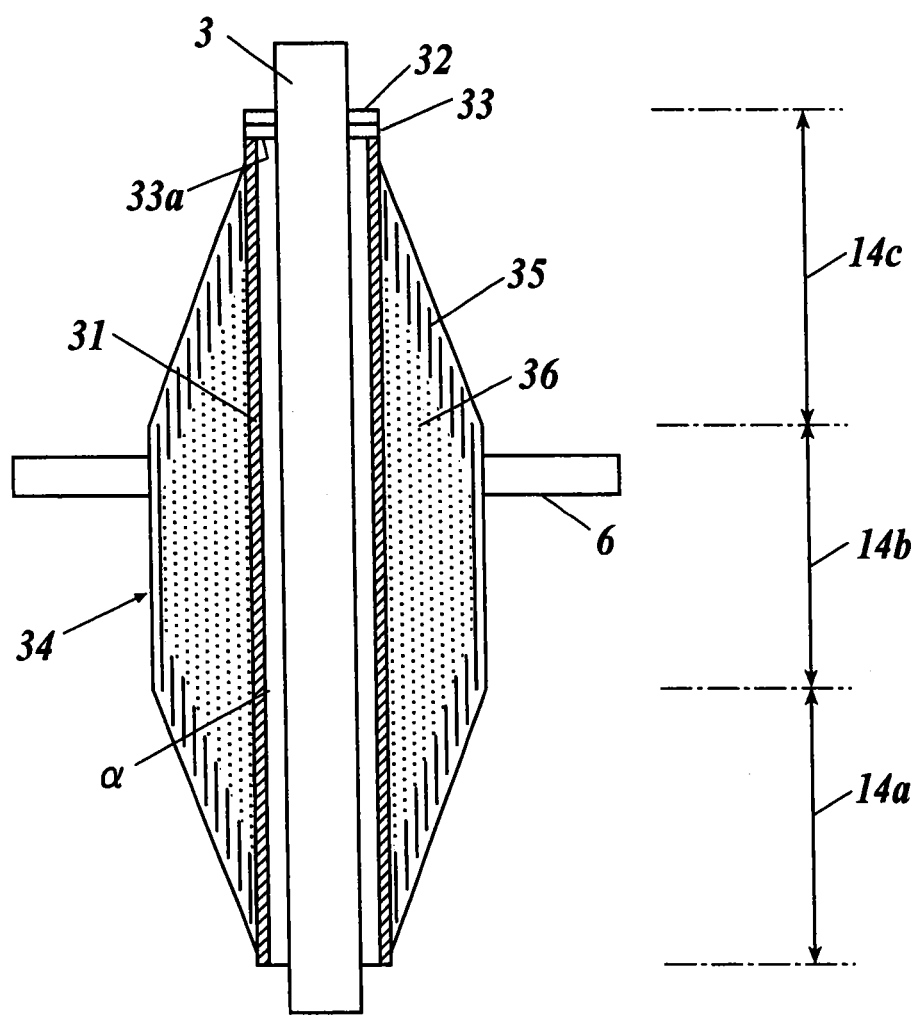
FIG. 2 This is an enlarged longitudinal sectional view of a capacitor-cone according to the embodiment of the present invention.

FIG. 1 is an essential part longitudinal sectional view of a termination connector for a cryogenic cable, a superconductive cable and the like according to the embodiment of the present invention. FIG. 2 is an enlarged longitudinal sectional view of a capacitor cone in the embodiment.

Figure 3:
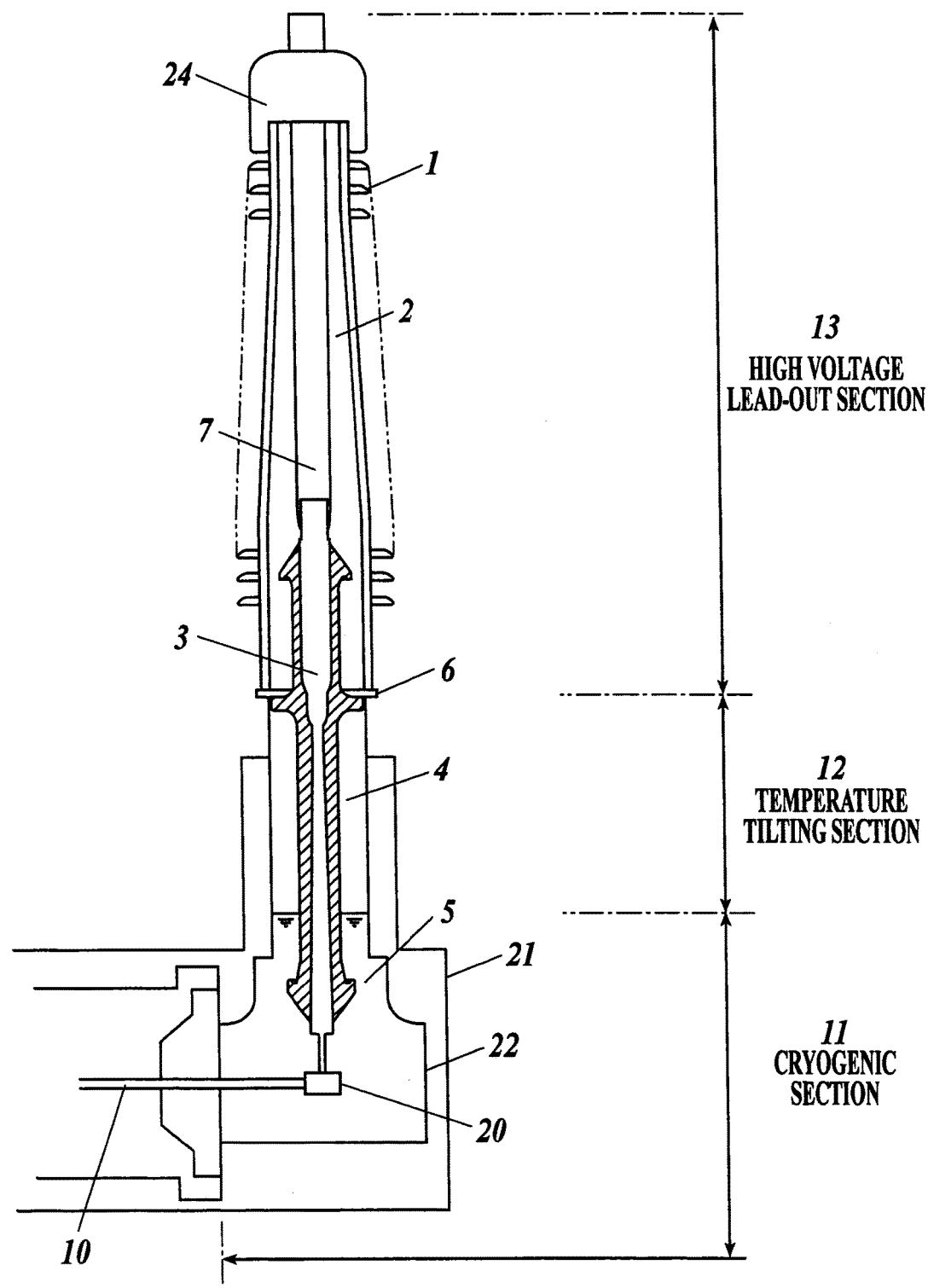
FIG. 3 This is a longitudinal sectional view showing an essential part of a cryogenic cable termination connector according to the conventional technique.
Figure 4:
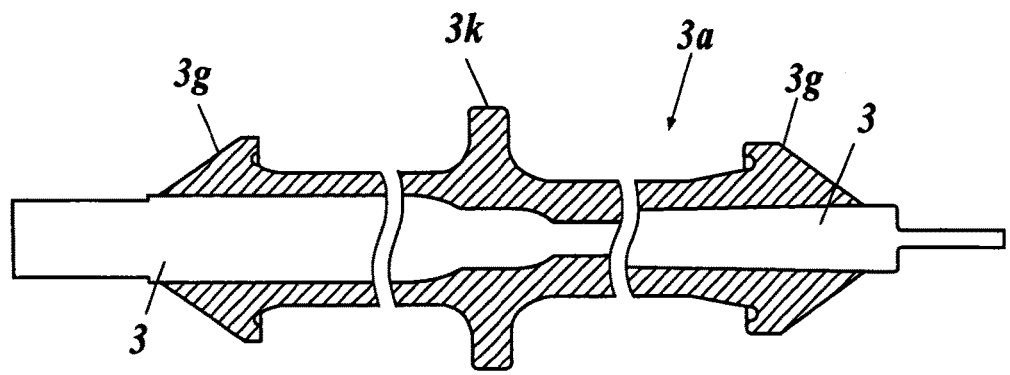
FIG. 4 This is an enlarged longitudinal sectional view of a stress cone according to the conventional technique.
Figure 5:
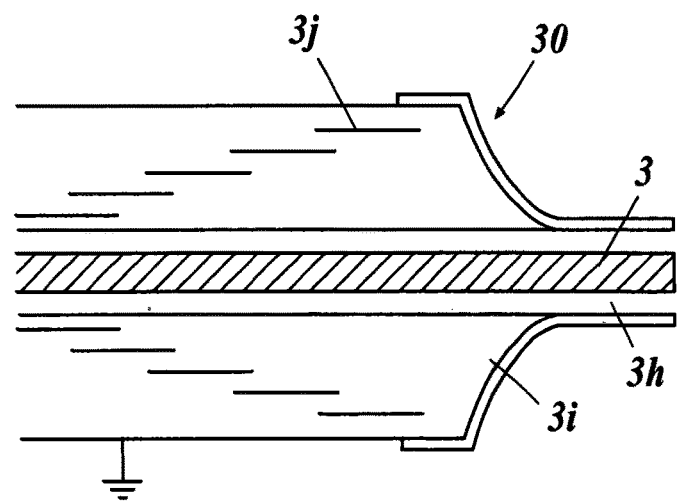
FIG. 5 This is an enlarged longitudinal sectional view of a capacitor cone according to the conventional technique.

In these figures, same reference numerals are appended to components which are basically same as in the conventional technique shown in FIG. 3.

In FIG. 1, the lower end of a lead-out conductor 3 is within a liquid refrigerant layer 5. In the embodiment, the lead-out conductor 3 is connected to a conductor 10 of a superconductive cable through a connecting terminal 20 such as a flexible connector, for example. The lead-out conductor 3 in which the lower end thus connected to the conductor 10 is led out upward to the end of a high voltage lead-out section 13, that is, a room temperature part via a cryogenic section 11, a temperature tilting section 12, a flange 6, and the high voltage lead-out section 13 connected above the temperature tilting section 12. Incidentally, the cryogenic section 11 and the temperature tilting section 12 mainly consist of an inner pressure vessel 22 made of SUS which is covered with an outer pressure vessel 21 which is similarly made of SUS and is forming a vacuum insulation layer, and a liquid refrigerant layer 5 and a refrigerant gas layer 4 which are formed in this inner pressure vessel 22 as shown in FIG. 1. A liquid refrigerant vessel 23 consists of the outer pressure vessel 21 and the inner pressure vessel 22. The reference numeral 5a indicates the liquid level of the liquid refrigerant layer 5.

In addition, the high voltage lead-out section 13 separated from the temperature tilting section 12 by the flange 6 mainly consists of an insulator 1, an oil layer 2 which consists of insulating oil and the like filled inside the insulator 1, and a high voltage terminal 24 which is provided at the end of the insulator 1.

The lead-out conductor 3 of the present invention thus located in the superconductive cable termination connector is at room temperature at a portion protruded into the air and is at a very low temperature at a portion located in the inner pressure vessel 22 of the liquid refrigerant vessel 23. Hence, the lead-out conductor 3 extends throughout a portion located in the cryogenic section 11, a portion located in the temperature tilting section 12, and a portion located in the high voltage lead-out section 13. The lead-out conductor 3, which has an insulator of a capacitor-cone structure, will be explained in detail using a longitudinal sectional view shown in FIG. 2.

A stainless hollow pipe 31 is coaxially arranged with a gap a circumferentially around the lead-out conductor 3 which consists of a good conductor such as copper or aluminum. The upper end of the hollow pipe 31 is supported on the lead-out conductor 3 using a flange 32. The flange 32 is formed as an annular flange with almost same outer diameter as the hollow pipe 31 and is fixed circumferentially around the lead-out conductor 3 which penetrates through the central part of the flange. The similarly annual end plate 33 is integrally formed at the upper end of the hollow pipe 31 and a hole 33a is formed at the central part of this end plate 33 for the lead-out conductor 3 to hermetically penetrate therethrough. The end plate 33 is attached to the flange 32 and thereby the hollow pipe 31 is supported on the lead-out conductor 3 in a positioning state.

The hollow pipe 31 need not be metal and can use a resin pipe made of such as FRP (Fiber Reinforced Plastics), which has a merit of reducing the heat penetration from a room temperature site. The space between the lead-out conductor 3 and the hollow pipe 31, being as a difference between the outer diameter of the lead-out conductor 3 and the inner diameter of the hollow pipe 31, is preferably equal to or more than 10 mm in order to be easy for the liquid refrigerant to penetrate thereinto.

A capacitor-cone insulator 34 which uses FRP as a main insulating material is formed circumferentially around this hollow pipe 31. The capacitor-cone insulator 34 has the same configuration as a capacitor-cone part which has been conventionally adopted in a termination connector such as an OF cable (oil-filled cable). That is, metal foils 35 each of which forms capacitor electrode of constant width are embedded in parallel with each other, at nearly regular intervals, and in a stepwise and concentric manner inside spindle-shaped cone portions 14a and 14c in the insulator 36.

As the insulator 36, epoxy resin, EPR (Ethylene Propylene Rubber), rubber, FRP and the like are used. In addition, the metal foils 35 consist of aluminum foil and the like and a capacitor with equal capacity is connected to one another in series from high voltage (lead-out conductor 3) side to low voltage (flange 6) side in the capacitor-cone insulator 34. Therefore, the electric field along the interface of the capacitor-cone insulator 34 is arranged almost uniformly. Furthermore, the metal foil 35 which is the outermost layer of the capacitor-cone insulator 34 is grounded with a ground wire (not shown in the drawings) attached thereto, and thereby the surface electric field of a cylinder portion 14b which has the outermost diameter of the lead-out conductor 3 can be at the ground voltage level. In addition, the cylinder portion 14b is provided with the flange 6, which is for separating the oil layer 2 and the refrigerant gas layer 4 in FIG. 1 and is fixed on the surface of the capacitor-cone insulator 34 by an adhesive and the like to prevent oil leakage and gas leakage.

As the second embodiment, a capacitor-cone insulator is produced using a film. As an insulating material, a polyimide film tape or a polyethylene film tape which are applied with an adhesive resin, a glass tape which has been previously impregnated with an epoxy resin, and the like are used. In a method for forming insulation, these films are winded up to be layered, and are bonded by the adhesive and the resin spreading between the films. The tapes are winded to about 1 mm to 2 mm thick and thereafter aluminum tape is winded to form the capacitor-cone insulator. The method can produce the capacitor-cone insulator without using a high pressure impregnation vessel and the like, and has a merit of reducing the production cost.

EXAMPLE

Subsequently, each effect will be explained together by taking a termination connector produced for a 275 kV superconductive cable as an example. A lead-out conductor 3 of the termination connector for the 275 kV superconductive cable uses a copper rod as a rod of the lead-out conductor 3. The outer diameter of the copper rod is 70 mm Ø. An FRP pipe, 85 mm Ø in inner diameter and 105 mm Ø in outer diameter, is used as the hollow pipe 31. A capacitor-cone insulator 34 is provided outside the hollow pipe 31 and a lower cone portion 14a is 1000 mm long, a cylinder portion 14b is 1500 mm long and an upper cone portion 14c is 1000 mm long.

A 275 kV air termination is required to withstand the impulse voltage of 1300 kV. As for the designed electric field of the capacitor-cone insulator 34 in this case, both surface strengths of the liquid refrigerant layer 5 and the oil layer 2 are about 1.3 kV/mm, being lower enough than 10 kV/mm which is a designed allowable electric field of them. Thus, a terminal with high reliability in electric insulation which has no electric discharge or insulation breakdown can be obtained.

Furthermore, the refrigerant gas layer 4 can be equal to or longer than 1000 mm, and thus it is possible to make the heat inflow from the wall surface of the liquefied refrigerant vessel 22 and from the lead-out conductor 3 within the layer be equal to or smaller than 500 w to achieve a termination connector having a small heat inflow.

When a short circuit or a ground fault occurs in the superconductive cable, a current which is 10 to 20 times the operation current instantly flows for a short period of time until the system breaker trips. In the 275 kV cable, up to 63 kA current flows for 0.6 seconds. When this short circuit or ground fault current instantly flows into the lead-out conductor of the termination connector, temperature rises by about 300° C. from a very low temperature of −196° C. to 100° C. by the Joule heating in the embodiment.

However, since the insulator is not directly applied to the lead-out conductor 3 and the space is maintained in the present invention, heat in the lead-out conductor 3 is not transferred to the insulator 36 and the temperature of the insulator 36 does not rise compared to the temperature before the short circuit current flows. Thereby, no split or crack is found in the insulator 36.

The above configuration can make up a superconductive cable termination connector device which can withstand a current test of a current at 3000 A and a voltage at 275 kV, impulse voltage of 1300 kV and short circuit current flow of 63 kA, providing a termination connector with high reliability. Although the example refers to a superconductive cable, the example has also the same function for a termination connector of a cryogenic cable.

According to the cryogenic cable termination connector of the example, insulation design having a great margin of withstand voltage can be made by immersing voltage gradient portions (cone portions 14a and 14c) of the capacitor-cone insulator 34 in the liquid refrigerant layer 5 and the oil layer 2. Furthermore, it is possible to avoid an accident of discharge and flashover in the gas layer with low withstand voltage characteristics by making the surface electric field of the insulator 36 in the refrigerant gas layer 4 with low dielectric strength voltage be at the ground electric field. In other words, both of the liquid level 5a of the liquid refrigerant layer 5 and the upper surface of the flange 6 (or the lower end of the oil layer 2) are desirably located within the range of the height of the cylinder portion 14b of the capacitor-cone insulator 34. Furthermore, providing a space between the lead-out conductor 3 and the hollow pipe 31 in the capacitor-cone insulator 34 makes it harder for excess stress to be loaded on the insulating coating at the insulating coating portion of the lead-out conductor 3 and for the resin insulating coating to be split up. Therefore, it is possible to provide a cryogenic cable termination connector with high reliability.

Industrial Applicability

The present invention can be used for a terminal structure of a cryogenic cable and a superconductive cable for transmitting power.

Explanation of Reference Numerals 1 insulator
2 oil layer
3 lead-out conductor
4 refrigerant gas layer
5 liquid refrigerant layer
10 conductor
11 cryogenic section
12 temperature tilting section
13 high voltage lead-out section
14a, 14c cone portion
14b cylinder portion
20 connecting terminal
21 outer pressure vessel
22 inner pressure vessel
23 liquid refrigerant vessel
24 high voltage terminal
31 hollow pipe
32 flange
33 end plate
33a hole
34 capacitor-cone insulator
35 metal foils

The invention claimed is:

1. A cryogenic cable termination connector comprising:
a lead-out conductor led out from a very low temperature site to a room temperature site via a liquid refrigerant layer, a refrigerant gas layer and an oil layer, the liquid refrigerant layer being positioned lower than the refrigerant gas layer and the refrigerant gas layer being positioned lower than the oil layer, wherein
the lead-out conductor is provided with a capacitor-cone insulator including a cylinder portion, and a plurality of metal foils for dividing an electric field from a high voltage level down to a ground voltage level, the plurality of metal foils being stacked throughout the insulator,
among electric field tilting portions of the capacitor-cone insulator in each of which voltage changes gradually from the high voltage level to the ground voltage level, the electric field tilting portion positioned lower than the cylinder portion is located in the liquid refrigerant layer and the electric field tilting portion positioned higher than the cylinder portion is located in the oil layer, the cylinder portion being at a ground voltage level in the outermost layer of the capacitor- cone insulator,
the capacitor-cone insulator is applied circumferentially around a hollow pipe,
the lead-out conductor penetrates from a room temperature part to a very low temperature part inside the hollow pipe,
an upper part of the hollow pipe has a hermetic structure between the upper part of the hollow pipe and the lead-out conductor inside the hollow pipe,
the lead-out conductor and the upper part of the hollow pipe are electrically connected to each other, and
a lower part of the hollow pipe is not provided with the hermetic structure such that liquid refrigerant of the liquid refrigerant layer penetrates into a space between the lower part of the hollow pipe and the lead-out conductor.

2. The cryogenic cable termination connector according to claim 1, wherein
a surface voltage level of the capacitor-cone insulator in the refrigerant gas layer is at the ground voltage level and the capacitor-cone insulator in the refrigerant gas layer is equal to or longer than 1000 mm.

3. The cryogenic cable termination connector according to claim 1, wherein
a difference between an outer diameter of the lead-out conductor and an inner diameter of the hollow pipe is at least 10 mm.

4. The cryogenic cable termination connector according to claim 1, wherein
a flange which hermetically separates the refrigerant gas layer and the oil layer is provided between the refrigerant gas layer and the oil layer circumferentially around the capacitor-cone insulator.

5. The cryogenic cable termination connector according to claim 1, wherein
a lower part of the hollow pipe is open between the lower part of the hollow pipe and the lead-out conductor inside the hollow pipe.

6. The cryogenic cable termination connector according to claim 1, wherein
the voltage of the capacitor-cone insulator located in the refrigerant gas layer is at the ground voltage level.

7. The cryogenic cable termination connector according to claim 1, wherein a boundary between the liquid refrigerant layer and the refrigerant gas layer is positioned lower than the cylinder portion.

8. The cryogenic cable termination connector according to claim 1, wherein the capacitor-cone insulator further includes an upper cone portion positioned upper than the cylinder portion, and an lower cone portion positioned lower than the cylinder portion, and the upper cone portion and the lower cone portion.

* * * * *